United States Patent [19]

Geibel et al.

[11] Patent Number: 5,003,033

[45] Date of Patent: Mar. 26, 1991

[54] PROCESS FOR PREPARING BRANCHED POLY(ARYLENE SULFIDE KETONE)

[75] Inventors: Jon F. Geibel; Lacey E. Scoggins, both of Bartlesville, Okla.; Michael D. Cliffton, Kingsport, Tenn.

[73] Assignee: Phillips Petroleum Company, Bartlesville, Okla.

[21] Appl. No.: 505,877

[22] Filed: Apr. 6, 1990

[51] Int. Cl.$^5$ .................. C08G 10/00; C08G 75/10
[52] U.S. Cl. .................... 528/226; 528/125; 528/126; 528/128; 528/220; 528/388
[58] Field of Search ............ 528/226, 220, 125, 126, 528/128, 388

[56] References Cited

U.S. PATENT DOCUMENTS

| | | | |
|---|---|---|---|
| 4,116,947 | 9/1978 | Edmonds et al. | 528/388 |
| 4,514,558 | 4/1985 | Shiiki et al. | 528/388 |
| 4,590,104 | 5/1986 | Zeiner et al. | 427/389.9 |
| 4,716,212 | 12/1987 | Gaughan | 528/226 |
| 4,795,799 | 1/1989 | Cleary | 528/222 |
| 4,812,552 | 3/1989 | Cliffton et al. | 528/226 |
| 4,826,906 | 5/1989 | Satake et al. | 524/381 |

Primary Examiner—Harold D. Anderson
Attorney, Agent, or Firm—Kenneth D. Goetz

[57] ABSTRACT

A process for preparing a branched, high molecular weight poly(arylene sulfide ketone) by the addition of a polyhaloaromatic compound to a reaction mixture containing a dihaloaromatic ketone, an organic amide, an alkali metal sulfide, and water, and the product produced therefrom.

15 Claims, No Drawings

PROCESS FOR PREPARING BRANCHED POLY(ARYLENE SULFIDE KETONE)

BACKGROUND OF THE INVENTION

This invention relates to the production of branched poly(arylene sulfide ketone)s. In another aspect, this invention relates to the production of high molecular weight branched poly(arylene sulfide ketone)s. In a further aspect, this invention relates to fiber reinforced composites and other articles of manufacture prepared from these poly(arylene sulfide ketone)s.

Poly(arylene sulfide ketone)s are useful engineering thermoplastics for film, molding, and composite applications because of their high melting points. One process for producing poly(arylene sulfide ketone)s involves the reaction of a dihaloaromatic ketone such as dichlorobenzophenone with an alkali metal sulfide in the presence of an organic amide and water. The alkali metal sulfide can be added as such or can be prepared from the reaction of an alkali metal bisulfide with an alkali metal hydroxide using approximately an equal molar amount of the alkali metal bisulfide with respect to the alkali metal hydroxide. A continuing problem remains however in that the molecular weight of such poly(arylene sulfide ketone)s is often not high enough to maintain a good balance of physical properties in the final article produced from the polymer. Therefore, methods of producing such poly(arylene sulfide ketone)s to an adequate degree of polymerization are still being sought.

A potential method for producing higher molecular weight poly(arylene sulfide ketone)s is polymerization in the presence of a polyhaloaromatic branching agent. However, due to the relatively high reactivity of the dihaloaromatic ketone, a successful branching agent would be expected to require a similar reactivity. Such branching agents are generally not readily available or are relatively expensive. Now a process has been discovered that unexpectedly produces higher molecular weight branched poly(arylene sulfide ketone)s using polyhaloaromatic branching agents that have much lower reactivities and are readily available or are relatively inexpensive.

SUMMARY OF THE INVENTION

It is an object of the invention to provide a process for producing branched poly(arylene sulfide ketone)s. It is a further object of the invention to provide a process for producing higher molecular weight poly(arylene sulfide ketone)s.

According to the invention, a process for the production of branched poly(arylene sulfide ketone)s is provided which comprises contacting at least one dihaloaromatic ketone, at least one organic amide, at least one alkali metal sulfide, water, and at least one polyhaloaromatic compound having the formula

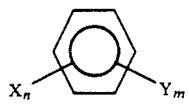

wherein X is a halogen selected from the group consisting of fluorine, chlorine, bromine and iodine, n is 3 or 4, m+n is 6, and each Y is selected from the group consisting of hydrogen, alkyl radicals having 1 to about 4 carbon atoms, $-NH_2$, and $-OR$ wherein R is an alkyl radical having 1 to about 4 carbon atoms, under polymerization conditions of temperature and time sufficient to form the poly(arylene sulfide ketone).

Further according to the invention, an article of manufacture is formed from the branched poly(arylene sulfide ketone) prepared as described above. In a specific aspect, the article of manufacture can be a film, molded object, or fiber reinforced composite formed from the branched poly(arylene sulfide ketone) of the invention.

DETAILED DESCRIPTION OF THE INVENTION

This invention relates to branched poly(arylene sulfide ketone)s prepared by contacting in a reaction mixture a dihaloaromatic ketone, an organic amide, an alkali metal sulfide, water, and a polyhaloaromatic compound.

Branched poly(arylene sulfide ketone)s are defined herein as the polymers which result from the use of polyhaloaromatic compounds in the polymerization under conditions effective for incorporation of the polyhaloaromatic compound as a branching agent. Branching agents are defined herein as compounds effective for introducing branch points in the polymer backbone. The effectiveness of polyhaloaromatic compounds as branching agents is measured herein by the increase in poly(arylene sulfide ketone) molecular weight relative to poly(arylene sulfide ketone) produced without the presence of polyhaloaromatic compounds in the polymerization.

Polyhaloaromatic compounds that can be employed in the process of the invention can be represented by the formula

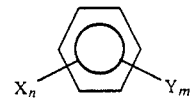

wherein X is a halogen selected from the group consisting of fluorine chlorine, bromine and iodine, n is 3 or 4, and m+n is 6. When n is 3, each Y is preferably hydrogen to ensure production of a branched poly(arylene sulfide ketone). When n is 4, Y can be hydrogen, or any of a variety of substituents including but not limited to alkyl radicals having 1 to about 4 carbon atoms, $-NH_2$ and $-OR$ wherein R is an alkyl radical having 1 to about 4 carbon atoms.

Examples of suitable polyhaloaromatic compounds which can be employed in the process of the invention include 1,2,3-trichlorobenzene, 1,2,4-trichlorobenzene, 1,3,5-trichlorobenzene, 1,2,3-trifluorobenzene, 1,2,4-trifluorobenzene, 1,3,5-trifluorobenzene, 1,2,4-tribromobenzene, 1,3,5-tribromobenzene, 1,2,3,4-tetrachlorobenzene, 1,2,4,5-tetrachlorobenzene, 1,2,3,5-tetrachlorobenzene, 1,2,3,4-tetrafluorobenzene, 1,2,4,5-tetrafluorobenzene, 1,2,3,5-tetrafluorobenzene, 1,2,4,5-tetrabromobenzene, 1,3-dichloro-4-fluorobenzene, 1,3-dichloro-2-fluorobenzene, 2,3,4,5-tetrachloroaniline, 2,3,5,6-tetrachloroaniline, 2,3,4,5-tetrachlorotoluene, 2,3,4,6-tetrachlorotoluene, 2,3,5,6-tetrachlorotoluene, 1-methoxy-2,3,5,6-tetrachlorobenzene, 2-methoxy-1,3,4,5-tetrachlorobenzene, 1-methoxy-2,3,5-trichlorobenzene, 3,4,5,6-tetrabromo-o-cresol, and the like, and mixtures of any two or more thereof. The presently preferred polyhaloaromatic is 1,2,4-trichlorobenzene because of its effectiveness, economics and commercial availability.

The amount of polyhaloaromatic compound employed according to the process of the invention can be conveniently expressed in terms of a molar ratio based on the alkali metal sulfide. Broadly, the molar ratio of polyhaloaromatic compound to alkali metal sulfide will be about 0.001:1 to about 0.02:1, preferably about 0.002:1 to about 0.01:1, and most preferably about 0.004:1 to about 0.008:1. The polyhaloaromatic compound will be effective as a branching agent in the process of the invention when added either at the beginning of the polymerization or during the polymerization.

Dihaloaromatic ketones that can be employed in the process of the invention can be represented by the formula

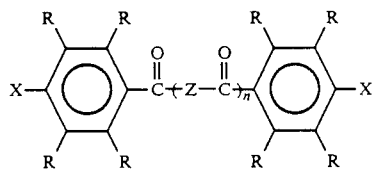

wherein each X is selected from the group consisting of fluorine, chlorine, bromine and iodine; Z is a divalent radical selected from the group consisting of

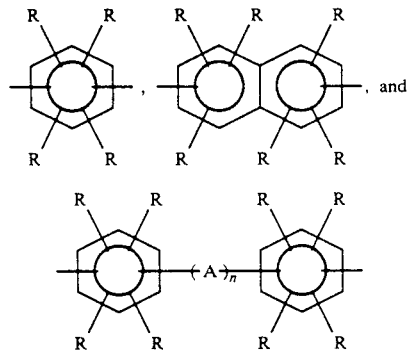

wherein n is 0 or 1, A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12. Preferably, each n is 0.

The process of the invention more preferably employs a dihalobenzophenone of the formula:

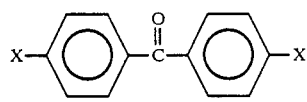

wherein X is defined as above for the dihaloaromatic ketones.

Examples of suitable dihaloaromatic ketones which can be employed in the process of the invention include 4,4'-dichlorobenzophenone, 4,4'-difluorobenzophenone, 4,4'-dibromobenzophenone, 4,4'-diiodobenzophenone, 4-chloro-4'-fluorobenzophenone, 1,4-bis-(4-fluorobenzoyl)benzene, 1,4-bis-(4-chlorobenzoyl)-benzene, 1-(4-chlorobenzoyl)-4-(4-fluorrobenzoyl)benzene, bis[4-(4-chlorobenzoyl)phenyl]thioether, bis(2,3,5,6-tetramethyl-4-chlorophenyl)ketone, bis[4-(4-chlorobenzoyl)phenyl]ether, 4,4'-bis-(4-chlorobenzoyl)-biphenyl, and the like, and mixtures of any two or more thereof. The presently preferred dihaloaromatic ketone is 4,4'-dichlorobenzophenone because of its effectiveness and commercial availability.

The amount of dihaloaromatic ketone employed in the invention depends upon the amount of alkali metal sulfide and the amount of polyhaloaromatic compound employed. The amount of dihaloaromatic ketone can be expressed in terms of the ratio of total number of halogen atoms in the dihaloaromatic ketone and the polyhaloaromatic compound to the moles of alkali metal sulfide and will generally be about 2:1. The preferred ratio of total number of halogen atoms in the dihaloaromatic ketone and the polyhaloaromatic compound to the moles of alkali metal sulfide is within the range of about 1.9:1 to about 2.1:1.

The organic amides used in the process of the invention should be substantially liquid at the reaction temperature and pressure employed. The amides can be cyclic or acyclic and can have 1 to to about 12 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, N-ethyl-2-pyrrolidone, N-cyclohexyl-2-pyrrolidone, ε-caprolactam, N-methyl-ε-caprolactam, N,N'-ethylene di-2-pyrrolidone, hexamethylphosphoramide, tetramethylurea, and the like, and mixtures thereof.

The amount of organic amide employed according to the invention can be expressed in terms of molar ratio based on the alkali metal sulfide employed. Broadly, the molar ratio of organic amide to alkali metal sulfide will be from about 4:1 to about 25:1, preferably from about 6:1 to about 16:1, and most preferably from about 8:1 to about 12:1. N-methyl-2-pyrrolidone is especially preferred because of excellent results and ready availability.

Alkali metal sulfides which can be employed in the process of the invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture. Sodium sulfide is preferred because of ready availability and good results obtained therewith. In a preferred embodiment, the alkali metal sulfide is prepared from alkali metal bisulfide and a base selected from the group consisting of alkali metal hydroxide, alkali metal carbonate, and mixtures of at least one alkali metal hydroxide with at least one alkali metal carbonate. When an alkali metal bisulfide is used, the amounts of the components based upon the alkali metal sulfide are based on the alkali metal bisulfide.

Alkali metal bisulfides that can be employed according to the invention include sodium bisulfide, lithium bisulfide, potassium bisulfide, rubidium bisulfide, cesium bisulfide, and mixtures thereof. Sodium bisulfide is preferred because of ready availability and good results obtained therewith. The alkali metal bisulfide can conveniently be utilized in the process of the invention as an aqueous solution. For example, an aqueous solution of sodium bisulfide having about 60 weight percent sodium bisulfide is convenient to use.

Alkali metal hydroxides that can be employed according to the invention include lithium hydroxide, sodium hydroxide, potassium hydroxide, rubidium hydroxide, cesium hydroxide, and mixtures thereof. Sodium hydroxide is preferred because of ready availability and good results obtained using this compound. The alkali metal hydroxide can conveniently be utilized in the process of the invention as an aqueous solution. For example, an aqueous solution of sodium hydroxide having about 50 weight percent sodium hydroxide is convenient to use.

Alkali metal carbonates that can be employed according to the invention include lithium carbonate, sodium carbonate, potassium carbonate, rubidium carbonate, cesium carbonate, and mixtures thereof. Sodium carbonate is preferred because of ready availability and generally good results obtained therewith.

If a mixture of at least one alkali metal hydroxide and at least one alkali metal carbonate is employed, said mixture should contain at least about 5 mole percent alkali metal carbonate. Preferably, said mixture will have about 20 to about 90 mole percent alkali metal carbonate, and more preferably about 40 to about 80 mole percent alkali metal carbonate. In any case, it is especially preferred that when the mixture of at least one alkali metal hydroxide and at least one alkali metal carbonate is employed according to the invention, that the molar ratio of alkali metal hydroxide to alkali metal bisulfide be less than about 1:1, and the molar ratio of alkali metal carbonate to alkali metal bisulfide be at least about 0.5:1.

The amount of water employed according to the process of the invention can be conveniently expressed in terms of a molar ratio based on the alkali metal sulfide. Broadly, the molar ratio of water to alkali metal sulfide will be about 3:1 to about 8:1, and preferably about 4:1 to about 6:1.

The charge sequence of the various compounds employed in the process of the invention can be varied as desired. One convenient method is to simply charge all the compounds in any desired sequence to a suitable reaction vessel equipped with agitation means at about room temperature and then to heat the mixture with stirring to the desired reaction temperature and to hold the mixture for the desired length of time at said temperature. It is also possible to preheat a mixture of only certain of the compounds in a separate vessel then to charge this mixture to a preheated mixture of the remainder of the compounds in the reaction vessel. In either method, the polyhaloaromatic compound can be added after the beginning of the polymerization as discussed above.

Although the reaction temperature at which the polymerization process of the invention can be conducted can vary over a wide range, it will generally be within the range of about 125° C. to about 450° C., preferably about 175° C. to about 350° C., more preferably about 225° C. to about 275° C. The reaction time can also vary widely depending in part on the reaction temperature employed but generally will be within the range of about 10 minutes to about 72 hours, preferably about 1 hour to about 20 hours. The pressure employed should be sufficient to maintain the polymerization reaction mixture substantially in the liquid phase. The pressure will generally be in the range of about 0 psig to about 400 psig, preferably about 150 psig to about 250 psig.

At the end of the polymerization process, the polymer can optionally be endcapped by adding an endcapping monomer such as 4,4'-dichlorobenzophenone or 4-chlorobenzophenone.

The poly(arylene sulfide ketone)s produced by the process of the invention generally can be recovered from the polymerization reaction mixture in particulate form employing any convenient method. For example, the reaction mixture can be diluted with water or a mixture of water with organic amide and the resulting particulate poly(arylene sulfide ketone) separated from this mixture by filtration. The recovered polymer is generally washed with water at least once and preferably several times with at least a portion of the washing being conducted at elevated temperature. A preferred recovery procedure includes a washing step in which the polymer is treated in the presence of an aqueous solution of a calcium salt, e.g. calcium acetate or calcium chloride, prior to a final washing with water. When calcium chloride is used in the recovery procedure, the polymer is preferably treated with an alkali metal hydroxide, e.g. NaOH, in a washing step prior to the calcium treatment.

The branched poly(arylene sulfide ketone)s produced according to the invention having a high molecular weight can be employed to make molded articles, film and the like as well as being employed in the production of fiber reinforced composites all of which exhibit heat distortion resistance characteristic of this high melting partially crystalline thermoplastic polymer.

EXAMPLES

EXAMPLE I

A series of polymerization runs were performed in a one liter, fast stirring reactor for the preparation of poly(phenylene sulfide ketone) (PPSK). The polymerization recipe for these runs is presented below.

| | Compound, g-mole |
|---|---|
| 4,4'-Dichlorobenzophenone (DCBP) | 0.2845–0.288 |
| Sodium bisulfide (NaSH)[a] | 0.288–0.2909 |
| Sodium hydroxide (NaOH) | 0.288 |
| N-methyl-2-pyrrolidone (NMP) | 3.46 |
| Water (H$_2$O)[b] | 0.864 |
| 1,2,4-Trichlorobenzene (TCB) | 0.–0.002304 |

[a]Charged as a solid NaSH-H$_2$O solution containing 58.7 weight percent NaSH.
[b]Does not include H$_2$O present in NaSH.

In each run the reactor was charged with DCBP, NaSH, NaOH, NMP, H$_2$O and optionally TCB. The reactor was sealed, agitation started and deoxygenating accomplished by six pressurize-release cycles using nitrogen. The temperature of the reaction mixture was raised to 250° C. and held for 3 hours. At this time a previously deoxygenated solution of 4-chlorobenzophenone (CBP) in NMP (0.00385 g-mole CBP in 1. g-mole NMP) was charged to the reactor and the reaction mixture held at 250° C. for 1 hour. The reaction mixture was then cooled.

The PPSK reaction mixture was washed with hot distilled water (80°–90° C.) and filtered twelve times. For runs 4–8, a sample of the washed PPSK was dried in a vacuum oven at 100° C. and tested for inherent viscosity. For runs 1–3, the filtered polymer was charged to the reactor with 500 mL of 1 weight percent NaOH solution, the reactor sealed and agitation started, and the reactor deoxygenated with nitrogen. The contents were then heated to 120° C. and cooled immediately. The polymer was filtered and washed 6 times in ambient distilled water. The filtered polymer was charged to the reactor with 500 mL of 5 weight percent calcium chloride (CaCl$_2$) solution, the reactor sealed and agitation started, and the reactor deoxygenated with nitrogen. The contents were then heated to 180° C., held for 30 minutes and cooled. The polymer was filtered and washed twice in ambient distilled water then dried in a vacuum oven at 100° C. and a sample tested for inherent viscosity.

Inherent viscosity was determined on samples of dried polymer in concentrated sulfuric acid at 30° C. at a polymer concentration of 0.5 grams per deciliter (g/dL) utilizing a #200 Cannon-Fenske Routine viscometer.

The results obtained are presented in Table I.

TABLE I

| Run No. | NaSH/NaOH, Mole Ratio | TCB/NaSH, Mole Ratio | Total No. Halogen Atoms[a] g-moles NaSH | I.V.[b] |
|---|---|---|---|---|
| 1(c) | 1.0 | 0. | 2.0 | 0.46 |
| 2 | 1.005 | 0.002 | 1.99 | 0.45 |
| 3 | 1.005 | 0.002 | 1.99 | 0.57 |
| 4(c) | 1.0 | 0. | 2.0 | 0.45 |
| 5(c) | 1.01 | 0. | 1.98 | 0.53 |
| 6 | 1.005 | 0.004 | 1.99 | 0.64 |
| 7 | 1.005 | 0.006 | 1.99 | 0.82 |
| 8 | 1.005 | 0.008 | 1.99 | 0.85 |

[a]Total number of halogen atoms was calculated by adding 3 · (g-moles TCB) and 2 · (g-moles DCBP).
[b]Inherent viscosity, dL/g.
[c]Control run The results in Table I indicate that the addition of 1,2,4-trichlorobenzene to the polymerization of PPSK produces higher molecular weight, branched PPSK as seen by the inherent viscosities of Run 3 v. Run 1 and Runs 6–8 v. Runs 4–5.

Control Run 1 is at a slightly different NaSH/NaOH mole ratio than Run 3. Although an increased inherent viscosity of the control would result from the addition of 0.5 mole percent excess NaSH, the inherent viscosity of Run 3 would still be higher. It is unclear why the inherent viscosity of Run 2 did not show a similar increase as Run 3.

Control Runs 4 and 5 are at 0. and 1. mole percent excess NaSH and the inherent viscosity of a control run at 0.5 mole percent excess should be approximately a linear average. Therefore, Runs 6–8 show a significant increase in molecular weight over the controls, as evidenced by inherent viscosity, which is consistent with the development of a branched polymer structure.

EXAMPLE II

A series of polymerization runs were performed in a two gallon, fast stirring reactor for the preparation of poly(phenylene sulfide ketone) (PPSK). The polymerization recipe for these runs is presented below.

| | Compound, g-mole |
|---|---|
| 4,4'-Dichlorobenzophenone (DCBP) | 1.982–2.0 |
| Sodium bisulfide (NaSH)[a] | 2.01 |
| Sodium hydroxide (NaOH) | 2.0 |
| N-methyl-2-pyrrolidone (NMP) | 24.84 |
| Water (H$_2$O)[b] | 6.0 |
| 1,2,4-Trichlorobenzene (TCB) | 0.–0.012 |

[a]Charged as a solid NaSH-H$_2$O solution containing 58.7 weight percent NaSH.
[b]Does not include H$_2$O present in NaSH.

In each run, the reactor was charged with DCBP, NaSH, NaOH, NMP, H$_2$O and optionally TCB. The reactor was sealed, agitation started and deoxygenating accomplished by four pressurize-release cycles using nitrogen. The temperature of the reaction mixture was raised to 250° C. and held for 3 hours. At this time a previously deoxygenated solution of 4-chlorobenzophenone (CBP) in NMP (0.0267 g-mole CBP in 6. g-mole NMP) was charged to the reactor and the reaction mixture held at 250° C. for 1 hour. The reaction mixture was then cooled.

The PPSK reaction mixture was washed with hot (80°–90° C.) distilled water and filtered five times for a total of five wash/filter cycles. The filtered polymer was charged to the reactor with 3000 mL of 1 weight percent NaOH solution, the reactor sealed and agitation started, and the reactor flushed three times with nitrogen. The reaction mixture was then heated to 120° C. and cooled immediately. Run 10 additionally contained 300 mL NMP during the NaOH wash. The polymer was filtered and rinsed once with ambient distilled water. The polymer was charged to the reactor with 3000 mL of a 5 weight percent calcium chloride solution, the reactor sealed and agitation started, and the reactor flushed three times with nitrogen. The reaction mixture was then heated to 185° C., held for 30 minutes and cooled. The polymer was filtered and washed at least once with ambient distilled water then dried in a forced air oven at about 120° C. A sample of the dried polymer was tested for inherent viscosity using the method described in Example I.

The results obtained are presented in Table II.

TABLE II

| Run No. | NaSH/NaOH Mole Ratio | TCB/NaSH, Mole Ratio | Total No. Halogen Atoms[a] g-moles NaSH | I.V.[b] |
|---|---|---|---|---|
| 9(c) | 1.005 | 0. | 1.99 | 0.55 |
| 10 | 1.005 | 0.004 | 1.99 | 0.57 |
| 11 | 1.005 | 0.006 | 1.99 | 0.60 |

[a]Total number of halogen atoms was calculated by adding 3 · (g-moles TCB) and 2 · (g-moles DCBP)
[b]Inherent viscosity, dL/g.
[c]Control run The results in Table II indicate that the addition of 1,2,4-trichlorobenzene to the polymerization of PPSK produces higher molecular weight, branched PPSK as seen by the inherent viscosities of Runs 10 and 11 v.

Run 9. The increase in inherent viscosities for the invention runs is consistent with the development of a branched polymer structure.

That which is claimed is:

1. A process for the production of a branched poly(arylene sulfide ketone) comprising contacting:
    (a) at least one dihaloaromatic ketone,
    (b) at least one organic amide,
    (c) at least one alkali metal sulfide,
    (d) water, and
    (e) at least one polyhaloaromatic compound having the formula

wherein X is a halogen selected from the group consisting of fluorine chlorine, bromine and iodine, n is 3 or 4, m+n is 6, and each Y is selected from the group consisting of hydrogen, alkyl radicals having 1 to about 4 carbon atoms, —$NH_2$, and —OR wherein R is an alkyl radical having 1 to about 4 carbon atoms, under polymerization conditions of temperature and time sufficient to form said poly(arylene sulfide ketone).

2. A process according to claim 1 wherein Y is hydrogen when n is 3.

3. A process according to claim 2 wherein said polyhaloaromatic is 1,2,4-trichlorobenzene.

4. A process according to claim 1 wherein the molar ratio of said polyhaloaromatic to said alkali metal sulfide is about 0.001:1 to about 0.02:1.

5. A process according to claim 4 wherein the ratio of the total number of said halogen atoms in said dihaloaromatic ketone and said polyhaloaromatic compound to the moles of alkali metal sulfide is about 1.9:1 to about 2.1:1.

6. A process according to claim 5 wherein the molar ratio of said organic amide to said alkali metal sulfide is about 4:1 to about 25:1.

7. A process according to claim 6 wherein the molar ratio of said water to said alkali metal sulfide is about 3:1 to about 8:1.

8. A process according to claim 7 wherein said alkali metal sulfide is prepared from alkali metal bisulfide and a base selected from the group consisting of alkali metal hydroxide, alkali metal carbonate, and mixtures of at least one alkali metal hydroxide with at least one alkali metal carbonate.

9. A process according to claim 8 wherein the molar ratio of said polyhaloaromatic compound to said alkali metal sulfide is about 0.002:1 to about 0.01:1.

10. A process according to claim 9 wherein said poly(arylene sulfide ketone) is poly(phenylene sulfide ketone), said dihaloaromatic compound is 4,4'-dichlorobenzophenone, said organic amide is N-methyl-2-pyrrolidone, said alkali metal sulfide is sodium sulfide and is prepared from sodium bisulfide and sodium hydroxide and said polyhaloaromatic compound is 1,2,4-trichlorobenzene.

11. A composition comprising branched poly(arylene sulfide ketone) produced according to the process of claim 1.

12. A composition according to claim 11 wherein said poly(arylene sulfide ketone) is poly(phenylene sulfide ketone).

13. An article of manufacture produced from branched poly(arylene sulfide ketone) according to the process of claim 1.

14. An article of manufacture according to claim 13 wherein said article produced from said poly(arylene sulfide ketone) is a fiber reinforced composite.

15. An article of manufacture according to claim 14 wherein said poly(arylene sulfide ketone) is poly(phenylene sulfide ketone).

* * * * *